July 31, 1951  H. E. HODGSON  2,562,788
ELECTROMAGNETIC BRAKE
Filed July 31, 1948
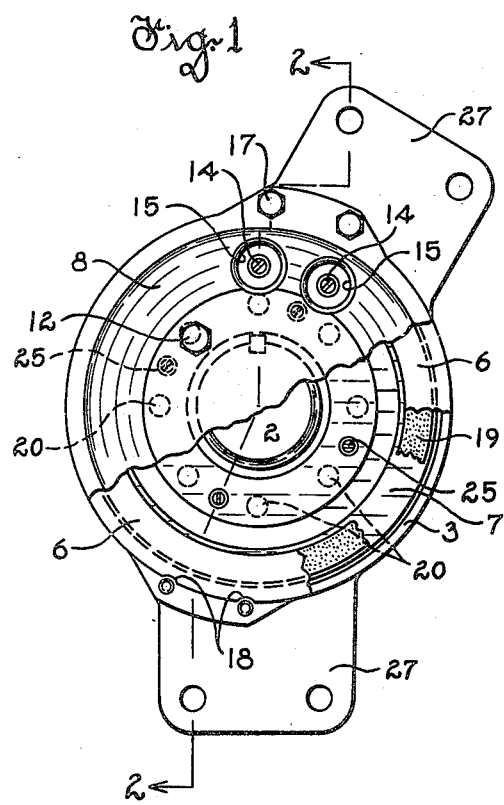
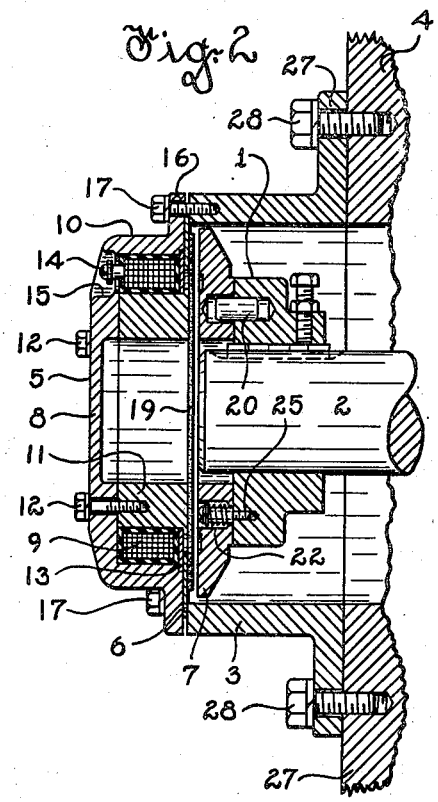
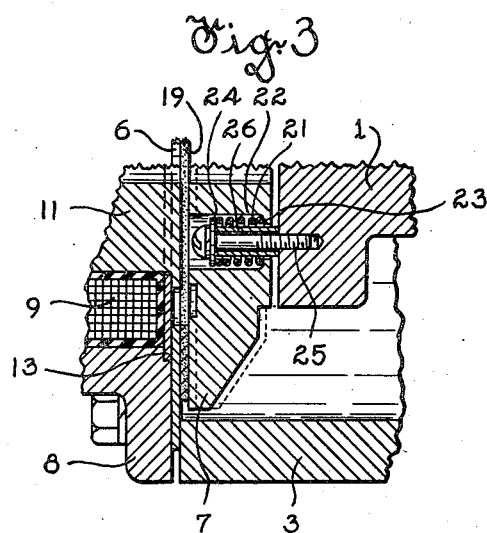
Inventor
Howard E. Hodgson
By Frank H. Hubbard
Attorney Patented July 31, 1951

2,562,788

UNITED STATES PATENT OFFICE 2,562,788

ELECTROMAGNETIC BRAKE

Howard E. Hodgson, Wauwatosa, Wis., assignor to Cutler-Hammer, Inc., Milwaukee, Wis., a corporation of Delaware Application July 31, 1948, Serial No. 41,825

4 Claims. (Cl. 188—164)

This invention relates to electromagnetic brakes of the disk type.

The invention has among its objects to provide an improved brake of the aforesaid type which is exceedingly simple, compact and rugged in construction, efficient and reliable in operation, and which is capable of being manufactured at relatively low cost.

Another object is to provide an enclosed brake of the aforesaid type which can be readily attached to a motor or other device to be braked and which is capable of giving long service without adjustment.

Another object is to provide an improved stationary braking element for brakes of the aforesaid type and to also provide improved supporting means thereof.

Various other objects and advantages of the invention will hereinafter appear.

The accompanying drawing illustrates an embodiment of the invention which will now be described, it being understood that various modifications may be made in the embodiment illustrated without departing from the spirit and scope of the appended claims.

In the drawing,

Figure 1 is a front elevational view of an electromagnetic brake embodying the invention with a portion of the magnet unit broken away;

Fig. 2 is a sectional view taken substantially on line 2—2 of Fig. 1, and

Fig. 3 is an enlarged fragmentary sectional view of certain of the parts illustrated in Fig. 2.

As illustrated in Fig. 2, the brake is provided with a hub 1 which may be keyed or otherwise secured to a shaft 2 of a motor or other device which is to be braked and a cylindrical housing 3 which surrounds said hub and is designed for mounting upon a casing 4 associated with such device. Also as illustrated in Fig. 2 the brake is provided with a magnet unit 5 and a friction disk 6 which are fixed to the front end of housing 3, and a cooperating armature member 7 which is mounted upon hub 1 to rotate therewith and to be attracted axially by said magnet unit into engagement with said friction disk for braking of shaft 1.

More specifically, magnet unit 5 is provided with a circular magnet frame 8 which carries an insulated magnet winding 9 of annular form. Frame 8 is recessed to provide an outer pole projection 10 which surrounds winding 9, and said winding is provided with an inner pole projection 11 of annular form which is secured within the recess in said magnet frame by screws 12.

Winding 9 is enclosed and held in assembled position within frame 8 by an annular coil shield 13 mounted upon the inner end of pole projection 10, and said winding is provided with a pair of terminal posts 14 which extend through openings 15 in frame 8. The inner end of pole projection 10 is provided with an outwardly extending peripheral supporting flange 16 which is attached to housing 3 by screws 17.

Friction disk 6 comprises a sheet steel member of annular form which is clamped between the front end of housing 3 and the flange 16 of magnet frame 8 by the screws 17. As shown in Fig. 1, disk 6 is held against rotation by notches 18 in the outer edge thereof which register with the securing screws 17, and as shown in Fig. 2 said disk has bonded thereto an annular coating 19 of powdered and sintered metal to be engaged by armature 7. The coating 19 may be applied to disk 6 by a well known process.

Armature member 7 is of annular form and is supported upon the front end of hub 1 by a plurality of guide pins 20 which are symmetrically disposed about the axis of said hub, as illustrated by dotted lines in Fig. 1. As shown in Fig. 2, the guide pins 20 are fixed within drilled openings in hub 2 and project into drilled openings in armature 7 to hold said armature against rotation with respect to said hub and to permit axial movement thereof. Armature member 7 is normally held in abutting engagement with the front face of hub 1 by a plurality of springs 21 which are symmetrically disposed about the axis thereof as illustrated in Fig. 1. As shown in Fig. 3, each of the springs 21 is mounted within an opening 22 in armature member 7 and is held under compression between the shoulder 23 on the inner end of said opening and a washer 24 carried by a screw 25 which threads into hub 1. Also as shown in Fig. 3, each of the screws 25 is surrounded by a sleeve 26 which is clamped between washer 24 and the face of hub 1 for a predetermined setting of spring 21.

As is apparent from the foregoing, armature member 7 is normally held in the position shown in Fig. 2 by its associated springs 21, and upon energization of winding 9 the same is attracted toward the left into engagement with the metal coating 19 on disk 6 for braking of shaft 2. It will be noted that the metal friction ring 6 renders the magnetic circuit between the pole faces of magnet frame 8 and armature member 7 of low reluctance to thereby increase the effectiveness of the brake. In order to prevent variation in braking torque due to wear of the braking surfaces magnet frame 8 and armature member 7 are designed to provide a magnetic circuit which is saturated upon energization of winding 9.

Housing 3 is designed to suit the casing 4 of the device upon which the brake is to be mounted, and in the embodiment illustrated the inner end of said housing is provided with a pair of outwardly extending feet 27 which are secured to said casing by screws 28. It should be noted that housing 3 serves as a support for the stationary parts of the brake and also as an enclosure for the rotating parts thereof. Also it should be noted that upon removal of screws 17 magnet unit 8 and friction disk 6 can be readily removed from the housing 3 for inspection or repair without substantial axial displacement thereof. In the embodiment illustrated friction disk 6 is in the form of a single annulus, but it is apparent that if desired such disk may comprise two semicircular sections.

What I claim as new and desire to secure by Letters Patent is:

1. In an electromagnetic brake, in combination, a rotatable shaft, a circular armature member mounted upon said shaft to rotate therewith and to move axially thereon, a stationary housing surrounding said shaft and said armature member, an electromagnet removably secured to one end of said housing for attracting said armature member to move the same axially on said shaft, and a thin metal friction disk of annular form to be engaged by said armature member upon attraction thereof by said magnet, said friction disk being non-rotatably clamped between said housing and said magnet.

2. In an electromagnetic brake, in combination, a rotatable shaft, a circular armature member mounted upon said shaft to rotate therewith and to move axially thereon, a stationary housing surrounding said shaft and said armature member, an electromagnet removably secured to one end of said housing for attracting said armature member to move the same axially on said shaft, and a stationary friction element to be engaged by said armature member upon attraction thereof by said magnet, said friction element being non-rotatably clamped between said housing and said magnet and comprising a sheet metal disk of annular form having a powdered and sintered metal friction surface bonded thereto on the side facing said armature member.

3. In an electromagnetic brake, in combination, a rotatable shaft, a circular armature member mounted upon said shaft to rotate therewith and to move axially thereon, a stationary housing surrounding said shaft and said armature member, a stationary magnet detachably secured to one end of said housing for attracting said armature member to move the same axially on said shaft, and a thin metal friction disk of annular form to be engaged by said armature member upon attraction thereof by said magnet, said friction disk being non-rotatably clamped between said magnet and said housing and being removable upon mere loosening of said magnet with respect to said housing and without substantial axial displacement of said magnet.

4. In an electromagnetic brake, in combination, a rotatable shaft, a circular armature member mounted upon said shaft to rotate therewith and to move axially thereon, a stationary housing surrounding said shaft and said armature member, a stationary magnet detachably secured to one end of said housing for attracting said armature member to move the same axially on said shaft, a thin metal friction disk of annular form to be engaged by said armature member upon attraction thereof by said magnet, said friction disk being clamped between said magnet and said housing and being removable upon detachment of said magnet from said housing without substantial axial displacement of said magnet, and spring biasing means associated with said armature member for normally maintaining the same in spaced relation with respect to said disk.

HOWARD E. HODGSON.

REFERENCES CITED

The following references are of record in the file of this patent:

UNITED STATES PATENTS

| Number | Name | Date |
|---|---|---|
| 829,334 | Hardie | Aug. 21, 1906 |
| 1,238,466 | Watson | Aug. 28, 1917 |
| 1,968,583 | Apple | July 31, 1934 |
| 2,217,464 | Arnold | Oct. 8, 1940 |
| 2,321,525 | Schroeder | June 8, 1943 |
| 2,389,061 | Kuzmick | Nov. 13, 1945 |